United States Patent
Smith

(10) Patent No.: US 11,634,107 B2
(45) Date of Patent: Apr. 25, 2023

(54) PORTABLE BLOWER ASSEMBLY

(71) Applicant: Glenn Smith, Missouri City, TX (US)

(72) Inventor: Glenn Smith, Missouri City, TX (US)

(*) Notice: Subject to any disclaimer, the term of this patent is extended or adjusted under 35 U.S.C. 154(b) by 177 days.

(21) Appl. No.: 17/329,846

(22) Filed: May 25, 2021

(65) Prior Publication Data
US 2022/0379850 A1 Dec. 1, 2022

(51) Int. Cl.
*B60S 3/00* (2006.01)
*F04D 25/06* (2006.01)
*F04D 29/58* (2006.01)
*F04D 25/08* (2006.01)
*H05B 3/00* (2006.01)
*A45D 20/08* (2006.01)

(52) U.S. Cl.
CPC .......... *B60S 3/002* (2013.01); *F04D 25/0673* (2013.01); *F04D 25/084* (2013.01); *F04D 29/582* (2013.01); *A45D 20/08* (2013.01); *H05B 3/00* (2013.01)

(58) Field of Classification Search
CPC .. B60S 3/002; B25F 5/00; B25F 5/006; B25F 5/008; B25F 5/02; B25F 5/025; B25F 5/026; A47L 15/48; A47L 15/486; A47L 2501/11; A47L 2501/12; F04D 25/084; B25B 23/16; B25G 1/10; B25G 1/102
See application file for complete search history.

(56) References Cited

U.S. PATENT DOCUMENTS

| | | | |
|---|---|---|---|
| 5,251,281 A | 10/1993 | Fravel, Jr. | |
| 6,286,228 B1 | 9/2001 | Bodnar | |
| 6,296,459 B1 * | 10/2001 | Saputo | F04D 17/164 417/244 |
| D610,244 S | 2/2010 | Gabbara | |
| 8,832,961 B1 | 9/2014 | Vandewater | |
| 2009/0271945 A1 * | 11/2009 | Ludwigson | F04D 25/084 417/364 |
| 2012/0093490 A1 * | 4/2012 | Steinberg | F24H 3/0417 392/384 |
| 2014/0325880 A1 * | 11/2014 | Shamji | B60S 3/047 37/230 |
| 2018/0223490 A1 * | 8/2018 | Garcia | E01H 5/102 |

FOREIGN PATENT DOCUMENTS

WO    WO0239042    5/2002

OTHER PUBLICATIONS

Como-Comet S Diesel chainsaw (Year: 1950).*
Homelite 200 Classic chainsaw (Year: 1993).*

* cited by examiner

*Primary Examiner* — Woody A Lee, Jr.
*Assistant Examiner* — Brian O Peters

(57) ABSTRACT

A portable blower assembly includes a cylinder that has an exhaust port integrated into the cylinder. A handle extends around the cylinder and the handle can be gripped by a user for directing the exhaust port toward a vehicle. A blower is rotatably integrated into the cylinder to urge air outwardly through the exhaust port thereby facilitating the air to be directed onto the vehicle for drying the vehicle when the blower is turned on. A heater is integrated into the cylinder such that the heater is in thermal communication with an interior of the cylinder. The heater is positioned between the blower and the exhaust port to heat the air is blown by the blower for enhancing drying the vehicle.

8 Claims, 5 Drawing Sheets

PORTABLE BLOWER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

Incorporation-by-Reference of Material Submitted on a Compact Disc or as a Text File Via the Office Electronic Filing System Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to blower devices and more particularly pertains to a new blower device for drying a vehicle after washing the vehicle. The device includes a cylindrical housing, a blower and a ring that extends around the cylinder for gripping.

(2) Description of Related Art Including Information Disclosed Under 37 CFR 1.97 and 1.98

The prior art relates to blower devices including a variety of portable blowers that each includes a housing, a blower positioned in the housing and an exhaust port for blowing air outwardly therefrom. In no instance does the prior art disclose a portable blower that includes a cylindrical housing and a handle that extends in closed ring around the cylindrical housing.

BRIEF SUMMARY OF THE INVENTION

An embodiment of the disclosure meets the needs presented above by generally comprising a cylinder that has an exhaust port integrated into the cylinder. A handle extends around the cylinder and the handle can be gripped by a user for directing the exhaust port toward a vehicle. A blower is rotatably integrated into the cylinder to urge air outwardly through the exhaust port thereby facilitating the air to be directed onto the vehicle for drying the vehicle when the blower is turned on. A heater is integrated into the cylinder such that the heater is in thermal communication with an interior of the cylinder. The heater is positioned between the blower and the exhaust port to heat the air is blown by the blower for enhancing drying the vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
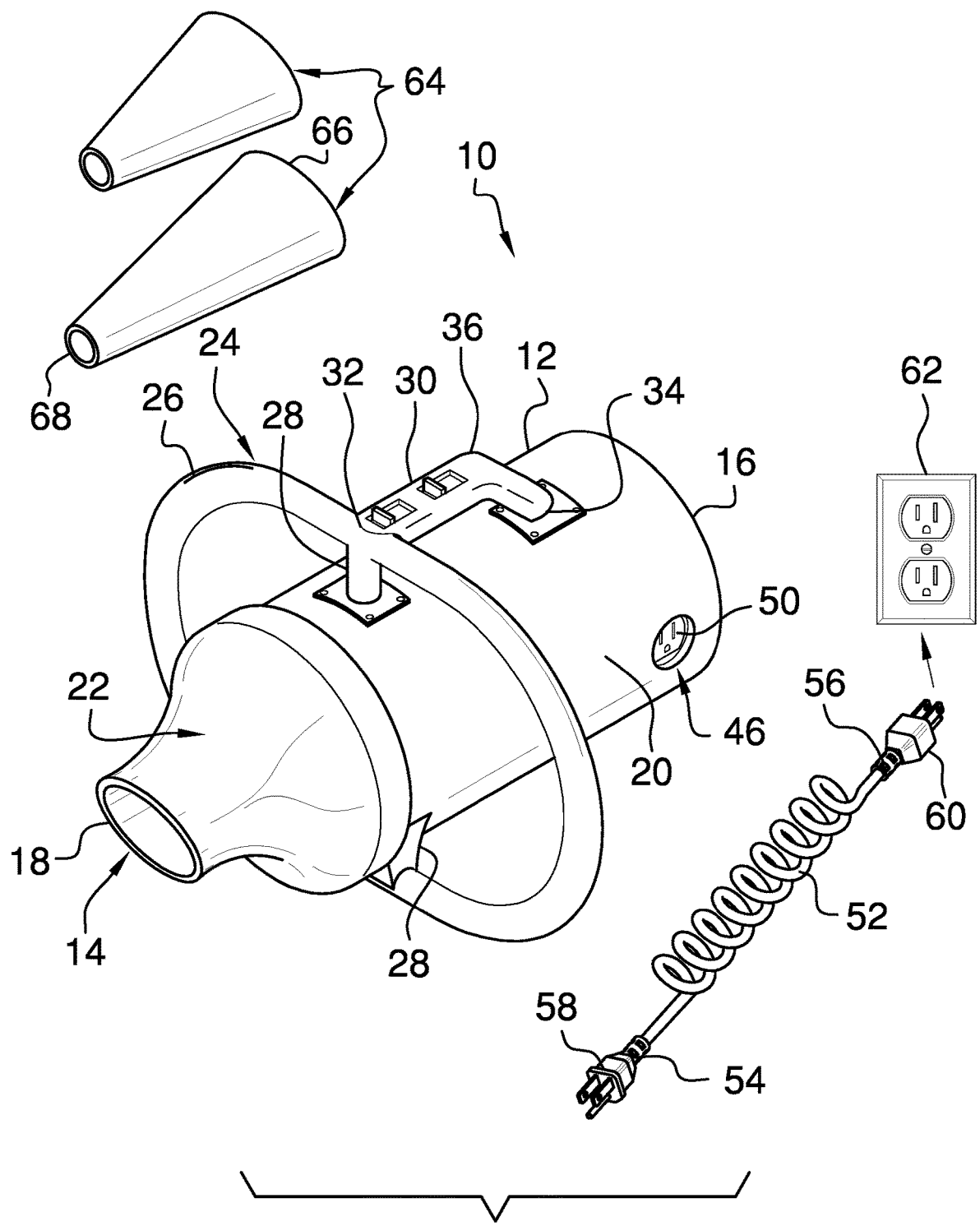
FIG. 1 is a perspective view of a portable blower assembly according to an embodiment of the disclosure.
Figure 2:
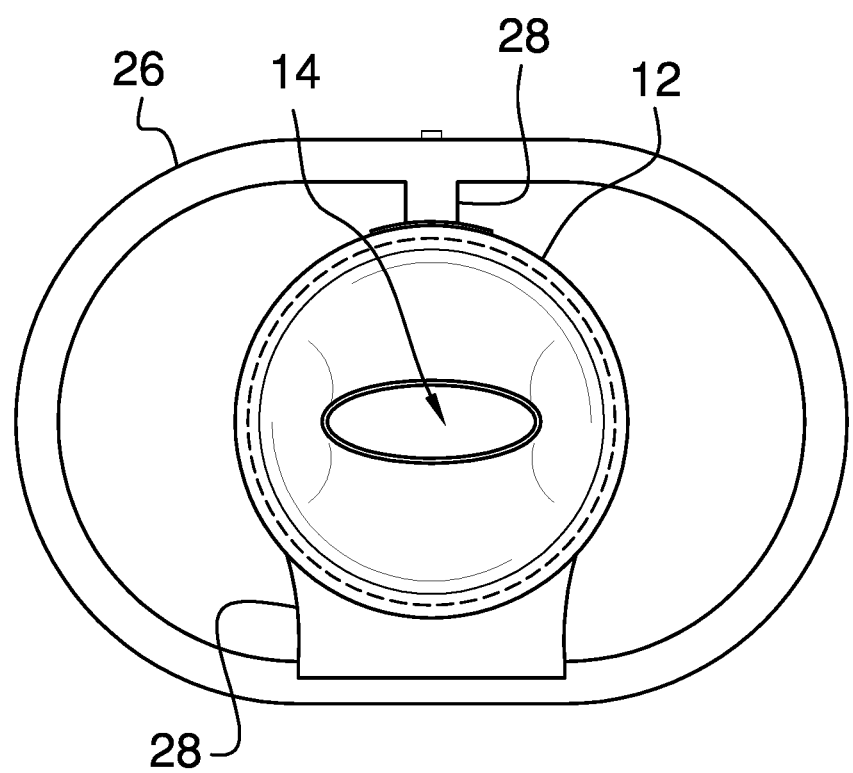
FIG. 2 is a front view of an embodiment of the disclosure.
Figure 3:
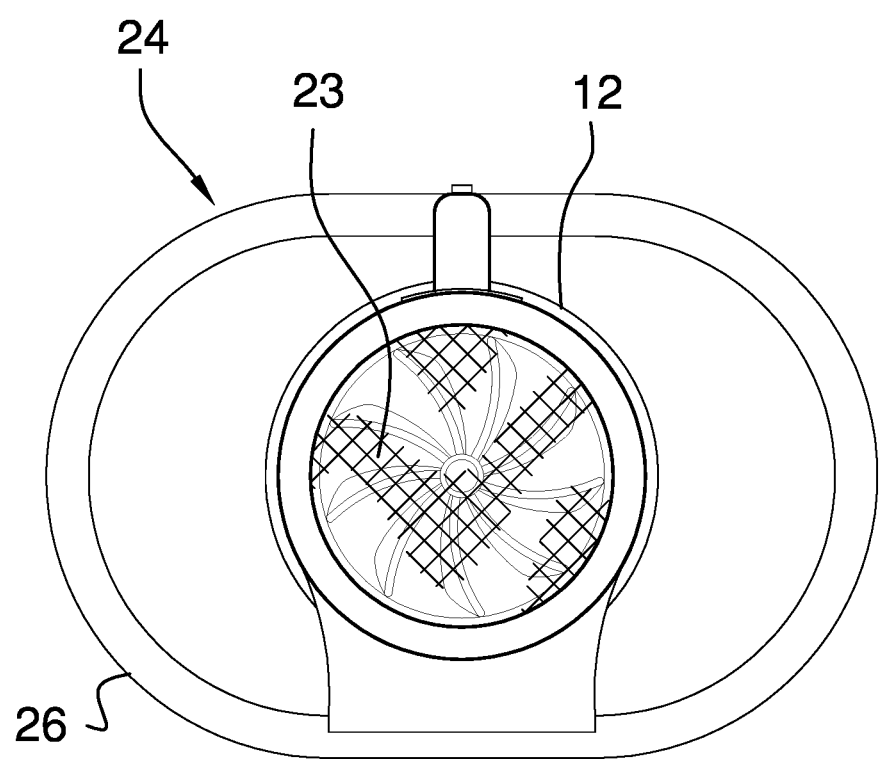
FIG. 3 is a back view of an embodiment of the disclosure.
Figure 4:
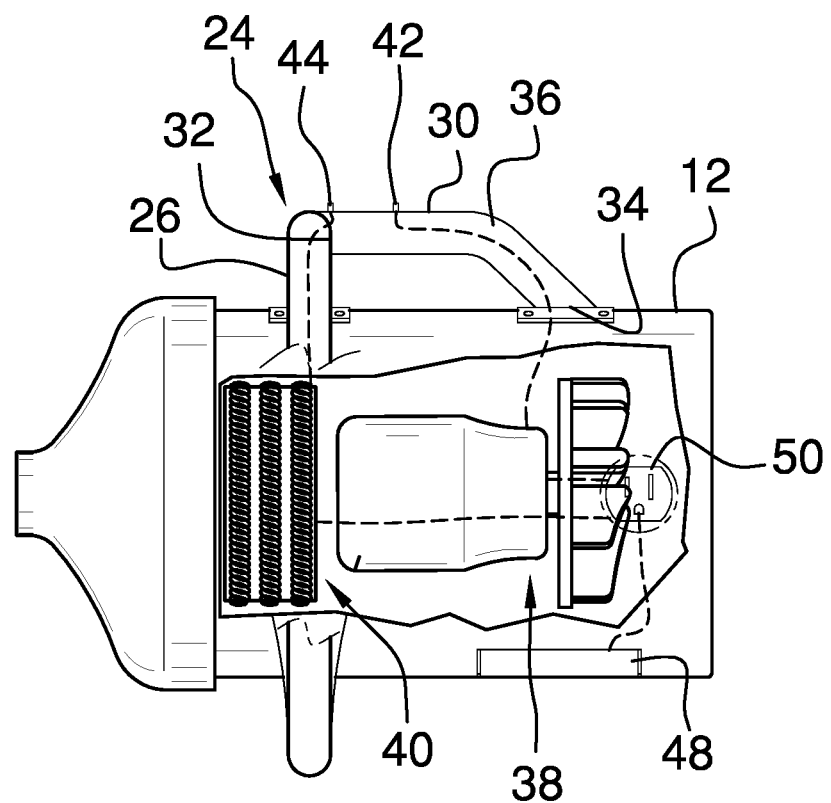
FIG. 4 is a left side cut-away view of an embodiment of the disclosure.
Figure 5:
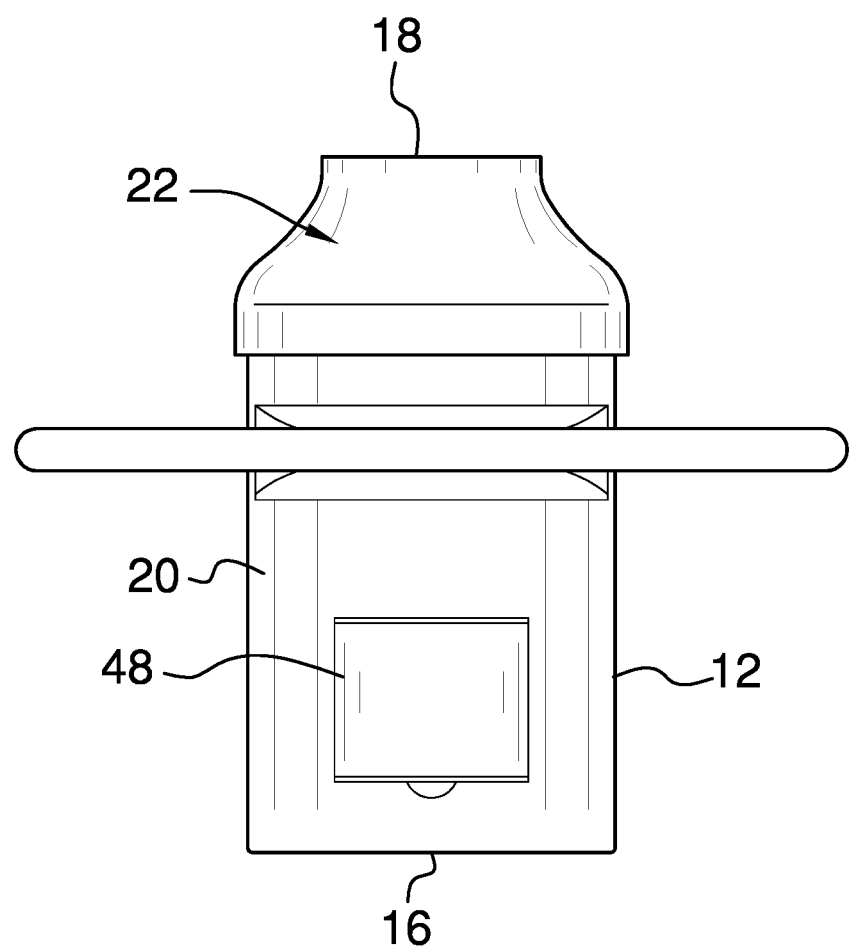
FIG. 5 is a bottom view of an embodiment of the disclosure.

With reference now to the drawings, and in particular to FIGS. 1 through 5 thereof, a new blower device embodying the principles and concepts of an embodiment of the disclosure and generally designated by the reference numeral 10 will be described.

As best illustrated in FIGS. 1 through 5, the portable blower assembly 10 generally comprises a cylinder 12 that has an exhaust port 14 integrated into the cylinder 12. The cylinder 12 has a rear end 16, a front end 18 and an outer wall 20 extending between the rear end 16 and the front end 18. The rear end 16 is open and the front end 18 is open such that the front end 18 defines the exhaust port 14. The outer wall 20 has a tapered section 22 extending from the front end 18 toward the rear end 16. Additionally, the tapered section 22 tapers inwardly toward the front end 18 such that the front end 18 has a diameter that is less than the diameter of the rear end 16. The front end 18 is elongated along an axis is oriented perpendicular to an axis extending through the rear end 16 and the front end 18 such that the front end 18 has an ovoid shape. As is most clearly shown in FIG. 3, a mesh screen 23 may be coupled to the rear end 16 to inhibit objects from passing through the rear end 16.

A handle 24 extends around the cylinder 12 such that the handle 24 can be gripped by a user for directing the exhaust port 14 toward a vehicle 24. The vehicle 24 may be a passenger vehicle, a cargo vehicle or any other type of vehicle that has body panels which periodically require washing. The handle 24 comprises a ring 26 that is spaced from and extends around the outer wall 20 of the cylinder 12. The ring 26 is elongated along an axis that is oriented perpendicular to the axis extending through the front end 18 and the rear end 16 of the cylinder 12 such that the ring 26 has an ovoid shape. The ring 26 is positioned closer to the front end 18 than the rear end 16.

The handle 24 includes a pair of supports 28 that is each coupled between the ring 26 and the outer wall 20 of the cylinder 12 for retaining the ring 26 on the cylinder 12. The supports 28 are positioned on opposite sides of the cylinder 12 with respect to each other. The handle 24 includes a member 30 that has a first end 32 and a second end 34. The member 30 has a bend 36 that is positioned between the first end 32 and the second end 34. Additionally, the first end 32 is coupled to the ring 26 and the second end 34 is coupled to the outer wall 20 of the cylinder 12 having the member 30 extending from the ring 26 toward the rear end 16 of the cylinder 12.

A blower 38 is rotatably integrated into the cylinder 12 such that the blower 38 can urge air outwardly through the exhaust port 14. In this way the air can be directed onto the vehicle 24 for drying the vehicle 24 when the blower 38 is turned on. The blower 38 is positioned adjacent to the rear end 16 of the cylinder 12 and the blower 38 urges air inwardly through the rear end 16 and outwardly through the front end 18 when the blower 38 is turned on. The blower 38 might include an electric motor and a fan that is rotatably coupled to the electric motor.

A heater 40 is integrated into the cylinder 12 such that the heater 40 is in thermal communication with an interior of the cylinder 12. Moreover, the heater 40 is positioned between the blower 38 and the exhaust port 14 such that the heater 40 can heat the air being blown by the blower 38. In this way the heater 40 enhances drying the vehicle 24. The heater 40 is positioned between the blower 38 and the front end 18 of the cylinder 12, and the heater 40 may comprise an electric heating coil or the like.

A blower switch 42 is provided and the blower switch 42 is movably integrated into the member 30 of the handle 24. Additionally, the blower switch 42 is electrically coupled to the blower 38 for turning the blower 38 on and off. Additionally, the blower switch 42 might be positionable in a plurality of speed settings, ranging between low and high, for adjusting the speed of the blower 38. A heater switch 44 is provided and the heater switch 44 is movably integrated into the member 30 of the handle 24. The heater switch 44 is electrically coupled to the heater 40 for turning the heater 40 on and off.

A power supply 46 is integrated into the cylinder 12 and the power supply 46 is electrically coupled to each of the blower switch 42 and the heater switch 44. The power supply 46 comprises at least one battery 48 that is removably integrated into the cylinder 12, and the at least one battery 48 is electrically coupled to each of the blower switch 42 and the heater switch 44. The power supply 46 includes a power port 50 that is recessed into the outer wall 20 of the cylinder 12 and the power port 50 is electrically coupled to the at least one battery 48. The power supply 46 includes a power cord 52 that has a first end 54 and a second end 56. A first plug 58 is electrically coupled to the first end 54 of the power cord 52 and a second plug 60 is electrically coupled to the second end 56 of the power cord 52. The first plug 58 is pluggable into the power port 50 such that the power cord 52 is in electrical communication with the power port 50 and the second plug 60 is pluggable into power source 62 for charging the at least one battery 48.

A pair of spouts 64 is included, each of the spouts 64 has a first end 66 and a second end 68, and each of the first end 66 and the second end 68 is open. Each of the spouts 64 tapers in diameter between the first end 66 and the second end 68. The first end 66 of a respective one of the spouts 64 is attachable to the front end 18 of the cylinder 12 to extend the length of the exhaust port 14. In this way the spouts 64 facilitate a large vehicle 24, such as a semi-tractor or other similar type of vehicle, to be dried.

In use, the handle 24 is gripped to direct the front end 18 of the cylinder 12 toward the vehicle 24 to be dried. The blower switch 42 is turned on the blow air outwardly through the front end 18 of the cylinder 12 for drying the vehicle 24 when the vehicle 24 has been washed. In this way the vehicle 24 can be dried without the need to manually wipe the vehicle 24, which could potentially scratch or mar the painted finish of the vehicle 24. Additionally, the heater switch 44 can be turned on to heat the air blown the by the blower 38 to enhance drying the vehicle 24. The ring 26 associated with handle 24 facilitates the cylinder 12 to be held at a variety of different orientations thereby enhancing efficiency and ease of ergonomics with respect to drying the vehicle 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable blower assembly for blowing heated air onto a vehicle for drying the vehicle, said assembly comprising:
   a cylinder having an exhaust port integrated into said cylinder;
   a handle comprising a ring that extends completely around and is spaced from said cylinder by a pair of supports positioned on opposite sides of said cylinder with respect to each other, wherein said handle is configured to be gripped by a user for directing said exhaust port toward a vehicle;
   a blower being rotatably integrated into said cylinder wherein said blower is configured to urge air outwardly through said exhaust port thereby facilitating the air to be directed onto the vehicle for drying the vehicle when said blower is turned on; and
   a heater being integrated into said cylinder such that said heater is in thermal communication with an interior of said cylinder, said heater being positioned between said blower and said exhaust port wherein said heater is configured to heat the air being blown by said blower for enhancing drying the vehicle.

2. The assembly according to claim 1, wherein said cylinder has a rear end, a front end and an outer wall extending between said rear end and said front end, said rear end being open, said front end being open to define said exhaust port, said outer wall having a tapered section extending from said front end toward said rear end, said tapered section tapering inwardly toward said front end such that said front end has a diameter being less than the diameter of said rear end, said front end being elongated along an axis being oriented perpendicular to an axis extending through said rear end and said front end such that said front end has an ovoid shape.

3. The assembly according to claim 2, wherein said ring being elongated along an axis being oriented perpendicular to said axis extending through said front end and said rear end of said cylinder such that said ring has an ovoid shape, said ring being positioned closer to said front end than said rear end.

4. The assembly according to claim 3, wherein each of said supports being coupled between said ring and said outer wall of said cylinder for retaining said ring on said cylinder.

5. The assembly according to claim 4, wherein said handle includes a member having a first end and a second end, said member having a bend being positioned between said first end and said second end, said first end being coupled to said ring, said second end being coupled to said outer wall of said cylinder having said member extending from said ring toward said rear end of said cylinder.

6. The assembly according to claim 1, wherein:
said handle includes a ring being spaced from and extending around said outer wall of said cylinder, said handle including a member being coupled to said ring;
a blower switch being movably integrated into said member of said handle, said blower switch being electrically coupled to said blower for turning said blower on and off; and
a heater switch being movably integrated into said member of said handle, said heater switch being electrically coupled to said heater for turning said heater on and off.

7. The assembly according to claim 6, further comprising a power supply being integrated into said cylinder, said power supply being electrically coupled to each of said blower switch and said heater switch, said power supply comprising:
at least one battery being removably integrated into said cylinder, said at least one battery being electrically coupled to each of said heater switch and said blower switch;
a power port being recessed into said outer wall of said cylinder, said power port being electrically coupled to said at least one battery; and
a power cord having a first end and a second end, said first end of said power cord having a first plug being electrically coupled thereto, said second end of said power cord having a second plug being electrically coupled thereto, said first plug being pluggable into said power port such that said power cord is in electrical communication with said power port, said second plug being pluggable into power source for charging said at least one battery.

8. A portable blower assembly for blowing heated air onto a vehicle for drying the vehicle, said assembly comprising:
a cylinder having an exhaust port integrated into said cylinder, said cylinder having a rear end, a front end and an outer wall extending between said rear end and said front end, said rear end being open, said front end being open to define said exhaust port, said outer wall having a tapered section extending from said front end toward said rear end, said tapered section tapering inwardly toward said front end such that said front end has a diameter being less than the diameter of said rear end, said front end being elongated along an axis being oriented perpendicular to an axis extending through said rear end and said front end such that said front end has an ovoid shape;
a handle extending around said cylinder wherein said handle is configured to be gripped by a user for directing said exhaust port toward a vehicle, said handle comprising:
a ring being spaced from and extending around said outer wall of said cylinder, said ring being elongated along an axis being oriented perpendicular to said axis extending through said front end and said rear end of said cylinder such that said ring has an ovoid shape, said ring being positioned closer to said front end than said rear end;
a pair of supports, each of said supports being coupled between said ring and said outer wall of said cylinder for retaining said ring on said cylinder, said supports being positioned on opposite sides of said cylinder with respect to each other; and
a member having a first end and a second end, said member having a bend being positioned between said first end and said second end, said first end being coupled to said ring, said second end being coupled to said outer wall of said cylinder having said member extending from said ring toward said rear end of said cylinder;
a blower being rotatably integrated into said cylinder wherein said blower is configured to urge air outwardly through said exhaust port thereby facilitating the air to be directed onto the vehicle for drying the vehicle when said blower is turned on, said blower being positioned adjacent to said rear end of said cylinder, said blower urging air inwardly through said rear end and outwardly through said front end when said blower is turned on;
a heater being integrated into said cylinder such that said heater is in thermal communication with an interior of said cylinder, said heater being positioned between said blower and said exhaust port wherein said heater is configured to heat the air being blown by said blower for enhancing drying the vehicle, said heater being positioned between said blower and said front end of said cylinder;
a blower switch being movably integrated into said member of said handle, said blower switch being electrically coupled to said blower for turning said blower on and off;
a heater switch being movably integrated into said member of said handle, said heater switch being electrically coupled to said heater for turning said heater on and off; and
a power supply being integrated into said cylinder, said power supply being electrically coupled to each of said blower switch and said heater switch, said power supply comprising:
at least one battery being removably integrated into said cylinder, said at least one battery being electrically coupled to each of said heater switch and said blower switch;
a power port being recessed into said outer wall of said cylinder, said power port being electrically coupled to said at least one battery; and
a power cord having a first end and a second end, said first end of said power cord having a first plug being electrically coupled thereto, said second end of said power cord having a second plug being electrically coupled thereto, said first plug being pluggable into said power port such that said power cord is in electrical communication with said power port, said second plug being pluggable into power source for charging said at least one battery.

\* \* \* \* \*